(12) United States Patent
Blanchard (10) Patent No.: US 8,794,953 B2
(45) Date of Patent: Aug. 5, 2014

(54) BLOW-MOLDING DEVICE PROVIDED WITH MEANS FOR ATTACHING, BY SUCTION, A HALF-MOLD TO A BACK WALL OF A CORRESPONDING RECESS OF A MOLD CARRIER

(75) Inventor: Jose Blanchard, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 134 days.

(21) Appl. No.: 13/389,118

(22) PCT Filed: Aug. 30, 2010

(86) PCT No.: PCT/EP2010/062622
§ 371 (c)(1),
(2), (4) Date: Feb. 6, 2012

(87) PCT Pub. No.: WO2011/026803
PCT Pub. Date: Mar. 10, 2011

(65) Prior Publication Data
US 2012/0135101 A1 May 31, 2012

(30) Foreign Application Priority Data
Sep. 7, 2009 (FR) ..................................... 09 56074

(51) Int. Cl.
*B29C 33/30* (2006.01)
*B29C 49/42* (2006.01)

(52) U.S. Cl.
USPC ............ 425/195; 425/522; 425/526; 425/541

(58) Field of Classification Search
CPC .............. B29C 2049/4856; B29C 2049/4858; B29C 49/4864; B29C 33/306; B29C 33/30
USPC ................... 425/195, 522, 541, 526; 249/102
See application file for complete search history.

(56) References Cited

U.S. PATENT DOCUMENTS 4,383,672 A * 5/1983 Kreuttner ................... 425/192 R
4,786,444 A * 11/1988 Hwang ...................... 425/192 R
(Continued)

FOREIGN PATENT DOCUMENTS

EP 0 821 641 B1 8/2000
EP 1 880 826 A1 1/2008
(Continued)

OTHER PUBLICATIONS

International Search Report, dated Sep. 24, 2010, from corresponding PCT application.
(Continued)

*Primary Examiner* — Robert B Davis
(74) *Attorney, Agent, or Firm* — Young & Thompson (57) ABSTRACT

Disclosed is a molding device (10) for a machine for manufacturing containers, in particular bottles, made of a thermoplastic material by blow-molding or stretch blow-molding a preheated preform. The molding device (10) includes: two half-molds (14), each of which is provided with a half-cavity (16) and each of which includes a sealing surface (18) and an outer surface (20); two mold carriers (34), each of which has a recess (40) for receiving a corresponding half-mold (14); and an attachment element (44, 52) for removably attaching each half-mold (14) into the recess (40) of the corresponding mold carrier (34), characterized in that the attachment element (44, 52) is controlled by the attraction of the half-mold (14) against the back wall (42) of the recess (40) of the mold carrier (34).

20 Claims, 10 Drawing Sheets

(56) References Cited

U.S. PATENT DOCUMENTS

| | | | |
|---|---|---|---|
| 5,458,825 A * | 10/1995 | Grolman et al. | 264/523 |
| 5,552,098 A | 9/1996 | Kudo et al. | |
| 5,620,635 A * | 4/1997 | DeRozier et al. | 249/102 |
| 5,968,560 A | 10/1999 | Briere et al. | |
| 6,464,486 B1 | 10/2002 | Barray et al. | |
| 2005/0013891 A1* | 1/2005 | Hall | 425/195 |
| 2006/0233909 A1* | 10/2006 | Perez et al. | 425/540 |
| 2007/0269545 A1 | 11/2007 | Ellis et al. | |
| 2008/0020085 A1 | 1/2008 | Bianchini et al. | |
| 2011/0052747 A1* | 3/2011 | Meinzinger | 425/541 |
| 2011/0057342 A1* | 3/2011 | Meinzinger et al. | 425/522 |
| 2012/0091634 A1* | 4/2012 | Meinzinger et al. | 264/523 |
| 2012/0161349 A1* | 6/2012 | Pasquier et al. | 425/186 |
| 2012/0251648 A1* | 10/2012 | Duclos et al. | 425/150 |
| 2013/0043622 A1* | 2/2013 | Hoellriegl et al. | 264/572 |

FOREIGN PATENT DOCUMENTS

| | | |
|---|---|---|
| FR | 2 646 802 A1 | 11/1990 |
| FR | 2 764 544 A1 | 12/1998 |
| JP | 9 066531 A | 3/1997 |
| JP | 09174559 A * | 7/1997 |
| JP | 2002/307445 A | 10/2002 |
| JP | 2005/246634 A | 9/2005 |

OTHER PUBLICATIONS

French Search Report, dated May 17, 2010, from corresponding PCT application.

* cited by examiner

BLOW-MOLDING DEVICE PROVIDED WITH MEANS FOR ATTACHING, BY SUCTION, A HALF-MOLD TO A BACK WALL OF A CORRESPONDING RECESS OF A MOLD CARRIER

The present invention concerns a molding device for a machine for producing chambers, notably bottles.

The present invention more particularly concerns a molding device for a machine for producing chambers, notably bottles, in thermoplastic material by blowing or drawing-blowing a pre-heated preform, the molding device including:

two half-molds each of which is provided with a half-imprint and each of which includes a joint face and an external face;

two mold-carriers each of which is provided with a recess intended to receive an associated half-mold in a mounted position in which the external face of the half-mold is in contact with the bottom of the recess; and fixing means adapted to fix each half-mold demountably in the recess of the associated mold-carrier.

There are known in the prior art molding devices intended to equip machines for producing chambers, notably but not exclusively so-called "rotary machines" including a carousel provided circumferentially with a particular number of identical blowing stations.

Plastic material chambers, such as bottles, flasks, etc. are produced therein from preforms or blanks pre-heated in a heat treatment oven. Depending on the number of imprints in the molds, at least one preform is fed in this way to a station of the machine to be inserted into a molding device with which blowing or drawing-blowing means are associated.

Such molding devices include at least one mold constituted of two half-molds supported by respective mold-carriers that are mounted to be mobile relative to each other.

Each half-mold is generally fixed to an associated mold-carrier in a removable manner by fixing means in order to enable demounting for a change of mold, in particular to proceed to the production of chambers of different shapes and/or different sizes or to replace them in the event of damage to and/or wear of the half-molds.

To reduce production costs as much as the time necessary for such demounting of the mold, various improvements to the molding devices are already proposed in the document EP-B1-0 821 641.

According to the teachings of the above document, means for regulating the temperature of the imprints of each half-mold are produced in a part (called the shell-carrier in the above document) separate from the half-mold (called a shell in the above document). The shell-carrier is intended to be carried permanently by the mold-carrier, whereas the half-mold (or shell) provided with the half-imprint is adapted to be removably fastened to the shell-carrier by fixing means. This configuration enables a light half-mold to be produced that is easily manipulated by a single operator.

The means for fixing the half-mold onto the mold-carrier are disposed on respective edges of the half-mold and the shell-carrier that are parallel to the main axis of the imprint. These fixing means include in particular means for rapidly screwing a clamping bar onto a joint face of the shell-carrier. The clamping bar includes clamping lugs projecting over the joint face of the half-mold to fix the half-mold firmly to the shell-carrier.

With the fixing means known in the art, the mounting and demounting operations are carried out by at least one operator and require the use of tools, such as screwdrivers or Allen keys, to operate the fixing means with the mold-carriers in the open position.

However, the aim is to reduce further the time necessary to mount and/or demount the half-molds (or shells in the aforementioned document) in such a manner as further to reduce the intervention times.

To this end, the invention proposes a molding device of the type described above characterized in that the fixing means are controlled means for attracting the half-mold against the bottom of the recess of the mold-carrier.

According to other features of the invention:

the half-mold is adapted to be mounted in and demounted from its recess by a movement in translation orthogonal to the joint face of the half-mold;

the fixing means are sucker-effect suction means;

at least one airtight chamber is reserved at the interface between the mold-carrier and the half-mold in the position mounted on the mold-carrier, and in that the airtight chamber communicating with a controlled vacuum source via an aspiration conduit to enable establishing in the airtight chamber of a fixing pressure less than atmospheric pressure;

the airtight chamber is formed in part by a cavity that is formed in the external face of the half-mold;

the airtight chamber is formed at least in part by a cavity that is formed in the bottom of the recess in the mold-carrier;

the airtight chamber is sealed by at least one seal that is carried by the half-mold;

the airtight chamber is sealed by at least one seal that is carried by the mold-carrier;

the half-mold is fixed to the mold-carrier by magnetic attraction between an electromagnet and a magnetic or ferromagnetic material;

the electromagnet is carried by the mold-carrier;

the half-mold includes means for positioning it on the mold-carrier;

the positioning means are means operative via nesting of complementary shapes between the associated half-mold and the associated mold-carrier;

the half-mold is equipped with means for mechanically attaching it to the mold-carrier in order to enable retention of the half-mold on the mold-carrier on stopping the controlled attraction means.

Other features and advantages will become apparent on reading the following detailed description, to understand which reference should be made to the appended drawings, in which.

In the remainder of the description, elements having similar, analogous or identical functions are designated by the same reference numbers.

In the remainder of the description, without this being limiting on the invention, longitudinal, vertical and transverse orientations of each mold-carrier 34 are as indicated by the orthogonal frame of reference "L,V,T" shown in the figures. The transverse direction "T" and the longitudinal direction "L" are thus fixed relative to each mold-carrier 34. For each mold-carrier 34, the transverse direction "T" is more particularly oriented from the exterior of the mold 12 toward the interior of the mold 12.

Figure 1:
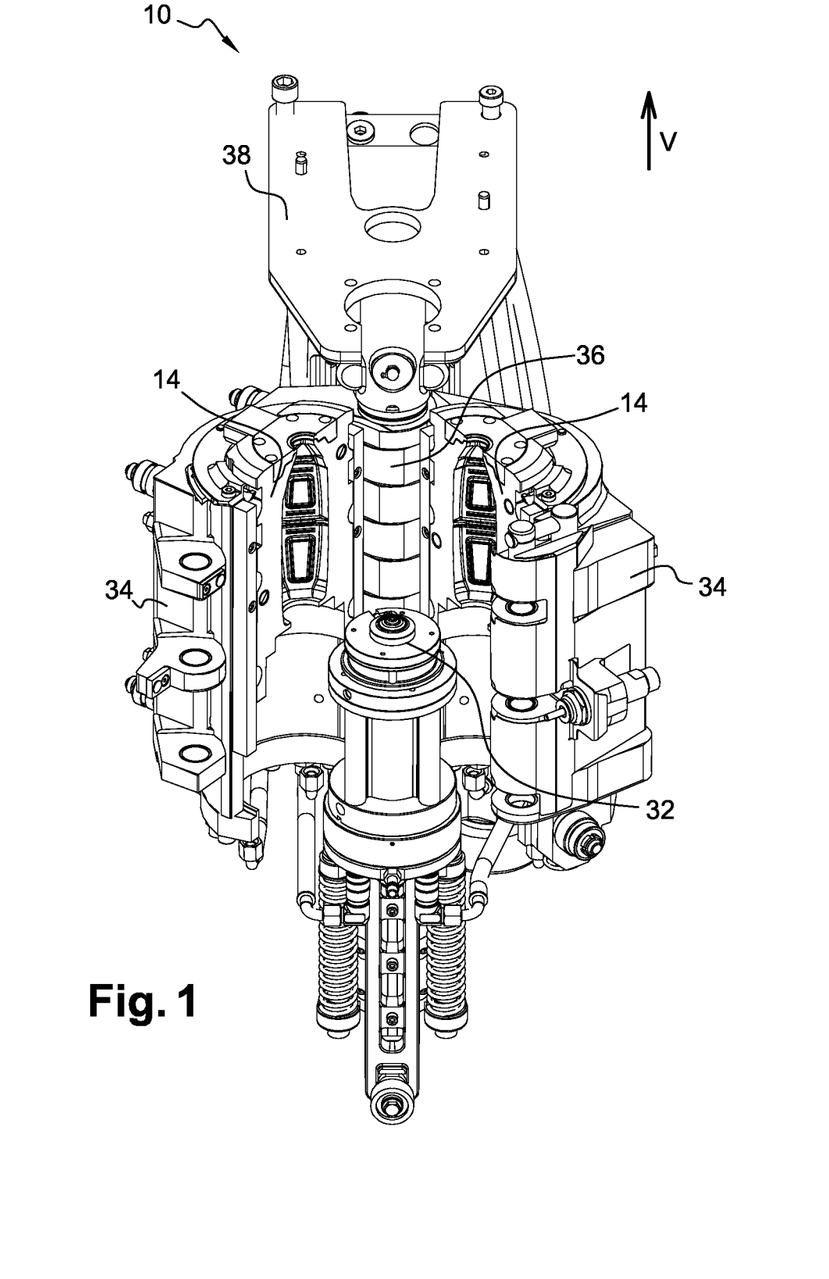
FIG. 1 is a perspective view showing a blowing device produced according to the teachings of the invention and including two mold-carriers provided with their half-mold.

There is shown in FIG. 1 a molding device 10 for a machine (not shown) for production of chambers, in particular bottles, in thermoplastic material by blowing or drawing-blowing a pre-heated preform.

The molding device 10 shown in FIG. 1 nevertheless constitutes only one nonlimiting embodiment of the type of molding device 10 to which fixing means produced according to the teachings of the invention may be applied.

The molding device 10 shown in FIG. 1 is more particularly intended to equip a station of a "rotary" type production machine, i.e. one generally including a carousel at the circumference of which are disposed stations each comprising a molding device 10 associated with blowing or drawing-blowing means, also known as blowing nozzles.

Nevertheless, the fixing means of the invention may equally well be used in a fabrication machine of linear (and not rotary) type.

See for example the document FR-2-764 544 for more details of blowing or drawing-blowing means.

Figure 2:
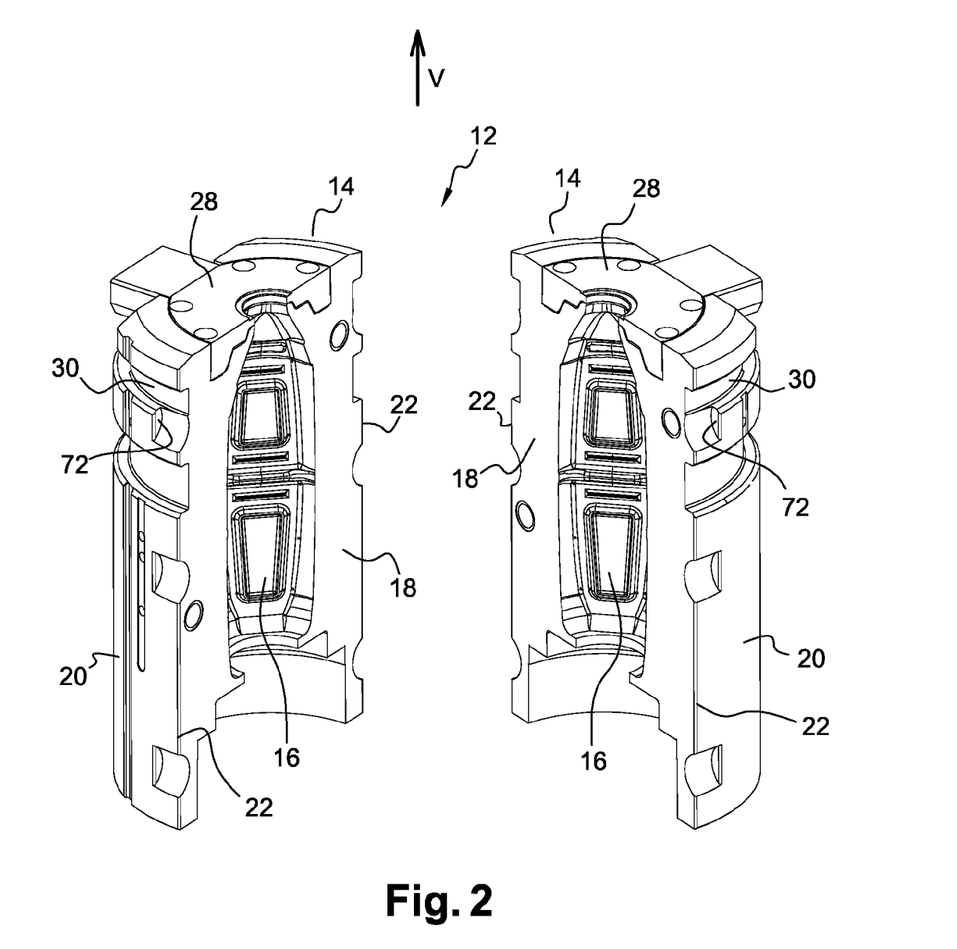
FIG. 2 is a perspective view showing the two half-molds from FIG. 1 in a separated position.
Figure 3:
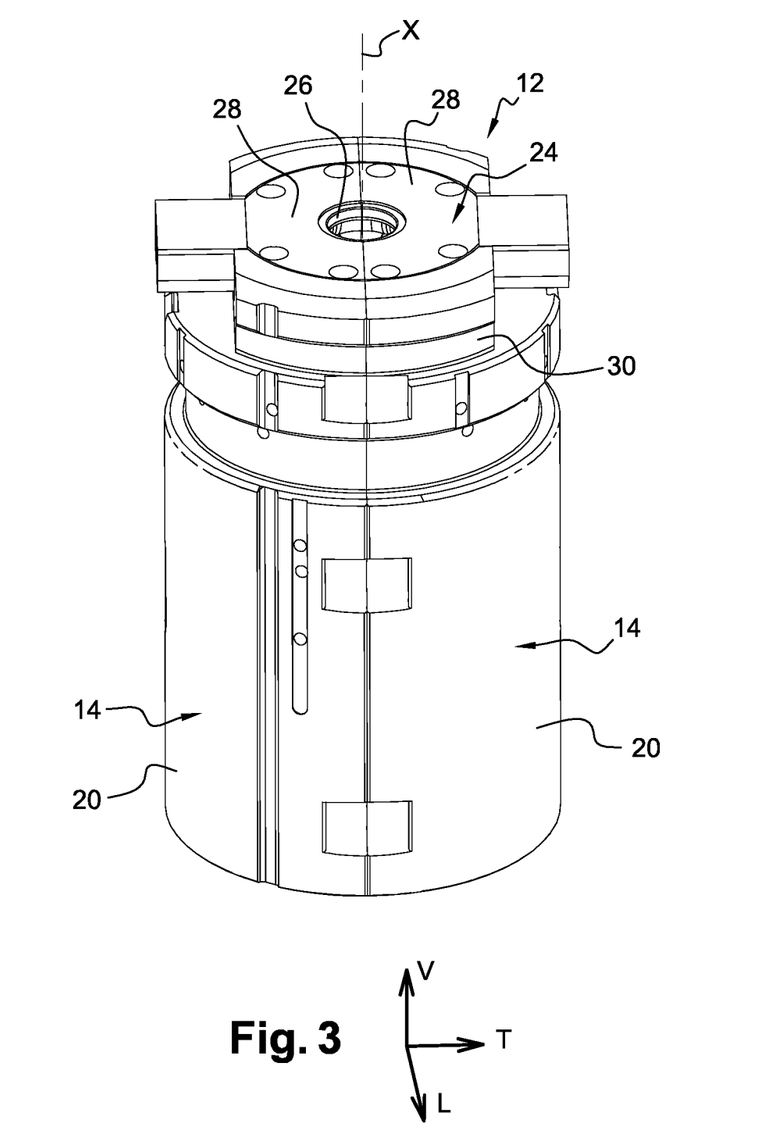
FIG. 3 is a perspective view showing the two half-molds from FIG. 1 in a joined position.

As may be seen in detail in FIGS. 2 and 3, the molding device 10 includes at least one mold 12 constituted of two half-molds 14. Here the mold 12 has a cylindrical shape divided axially into two parts to form each half-mold 14.

Each half-mold 14 includes a half-imprint 16 of the final chamber recessed into a joint face 18. Here the joint face 18 is a plane vertical face that is formed by the section face of the cylinder forming the mold 12. The joint faces 18 face each other when the half-molds 14 are in the joined position.

Each half-mold 14 further includes an external face 20 opposite the joint face 18 having the overall shape of a circular half-cylinder substantially coaxial with the vertical main axis X of the imprint 6 of the chamber.

Each half-mold 14 has two vertically oriented rectilinear edges 22 at the junction between its joint face 18 and its external face 20.

The half-molds 14 are adapted to occupy a separated position, as shown in FIG. 2, in which the two half-molds 14 are spaced from each other, and a joined position, as shown in FIG. 3, in which the two half-molds 14 are joined together at their joint face 18 to form the mold 12.

In the joined position, the mold 12 has a circular horizontal upper face 24 with a central opening 26 adapted to enable insertion of the preform, or even of a drawing rod.

The upper face 24 of each half-mold 14 is preferably formed by a separate plate 28 firmly attached to each half-mold 14. The lower end of a nozzle (not shown) comprising the blowing or drawing-blowing means is adapted to come into contact with the surface of the plate 28.

The half-molds 14 further include in their upper part, just below the horizontal upper face, an annular groove 30 that extends circumferentially and continuously around the two half-molds 14 when they are joined.

If the chamber to be fabricated has a bottom of complex shape, in particular a petal shape, problems are then likely to arise with removal from the mold.

It is for this reason that there is then advantageously provided a separate mold bottom 32, separate from the half-molds 14, said mold bottom 32 including an imprint of the bottom of the chamber complementary to the half-imprints 16. FIG. 1 shows such a mold bottom 32.

Each half-mold 14 is intended to be demountably fixed to an associated mold-carrier 34 of the molding device 10. Such mold-carriers 34 are shown in more detail in FIGS. 4 and 5.

Figure 4:
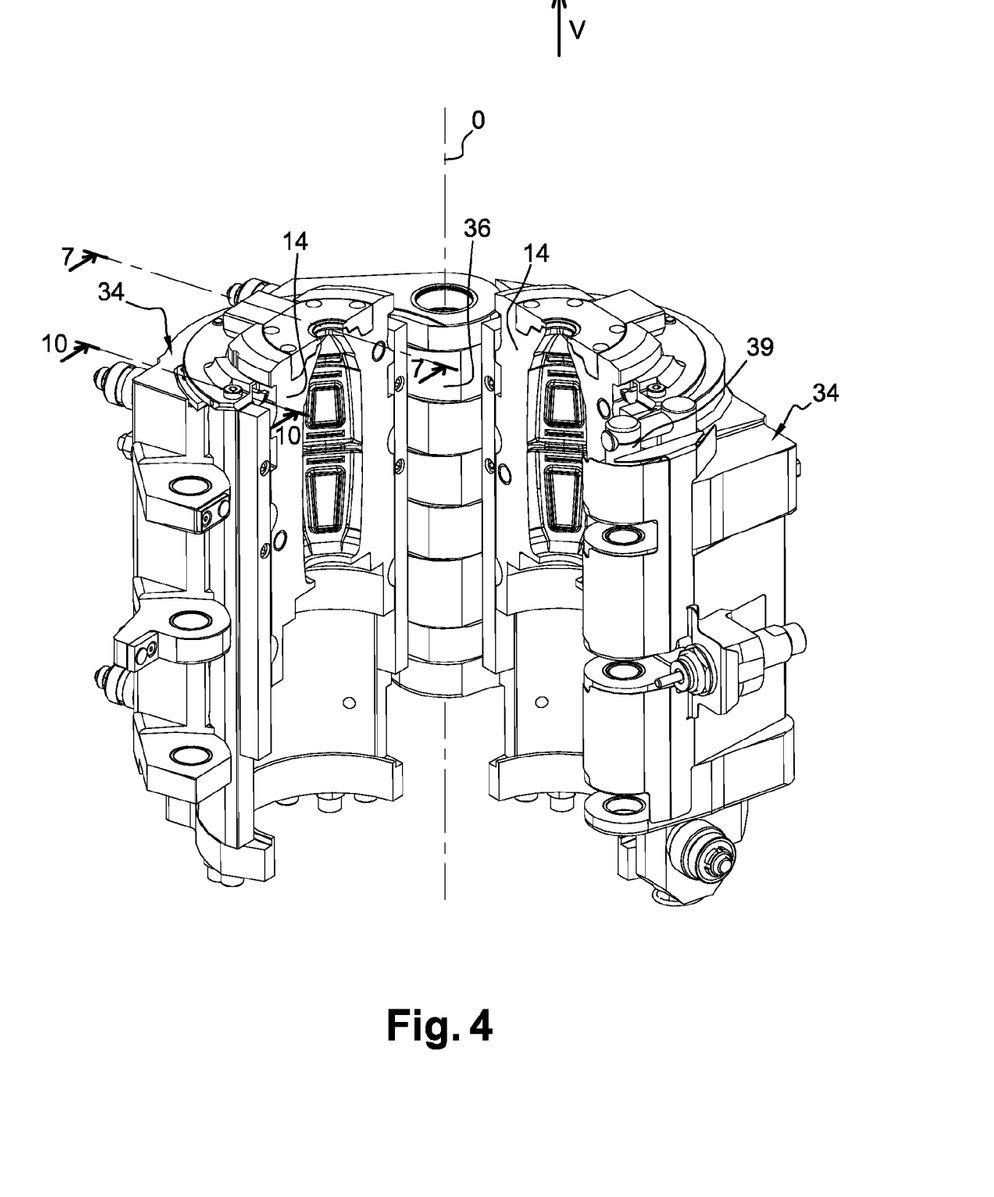
FIG. 4 is a perspective view to a larger scale showing the two mold-carriers from FIG. 1 in an open position.
Figure 5:
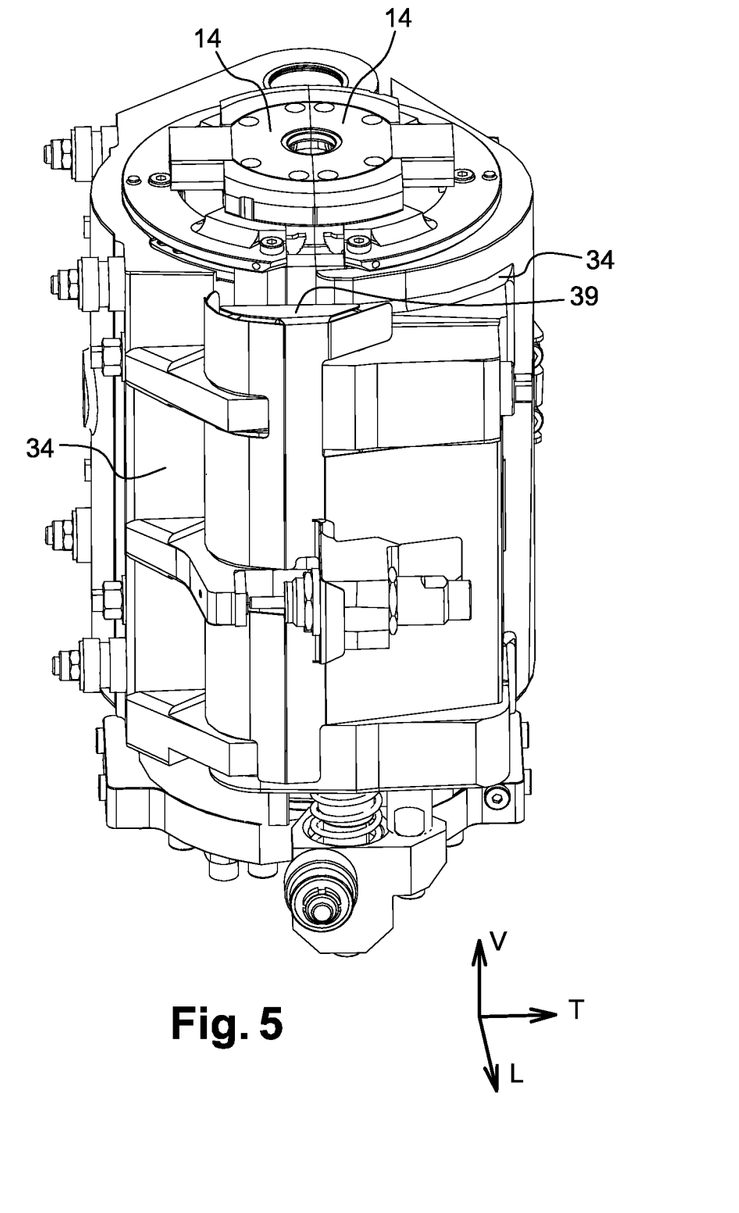
FIG. 5 is a view similar to that of FIG. 4 showing the two mold-carriers in a closed position.

The two mold-carriers 34 are mounted to be mobile relative to each other between a closed position, as shown in FIG. 5, in which the two half-molds 14 are joined to form the imprint 16, and an open position, as shown in FIG. 4, in which the two half-molds 14 are separated, for example to enable the ejection of a chamber after blowing.

In the example shown in FIGS. 1, 4 and 5, the mold-carriers 34 are constituted in the form of two carrier structures articulated about a common hinge 36 with pivot axis O that extends vertically. As shown in FIG. 1, the hinge 36 is carried by a bracket 38 that is fixed relative to the carousel (not shown).

The mold-carriers 34 are then able to move apart from each other by pivoting about the axis O and are consequently mounted to pivot between their open position (FIG. 4) and their closed position (FIG. 5).

As shown in FIG. 5, when the mold-carriers 34 are opened from their closed position, they begin to move away from each other in a transverse opening direction that is orthogonal to the joint face 18 of the half-molds 14.

Because of the kinematics of the mold-carriers 34, such a molding device 10 is referred to as a "book-like opening" mold.

In a variant of the invention that is not shown, the molding device includes two mold-carriers 34 mounted to be mobile in translation relative to each other in a transverse direction between an open position and a closed position.

The molding device 10 further includes a lock 39 that is longitudinally disposed in the front part diametrically opposite the hinge relative to the vertical axis "X" of the imprint 16.

This kind of lock 39 is also known in the art and is therefore not described in detail here. This lock 39 has the notable function of preventing any inopportune opening during blowing, where the pressures may reach 30 to 40 bars, depending on the application.

For fuller details on the structure and operation of such a lock 39, see for example the document FR 2 646 802.

Moreover, the mold-carrier 34 is provided with means (not shown) for regulating the temperature of the imprint 16 that are constituted by conduits formed in the thickness of the mold-carrier 34 and in which a heat-exchange fluid flows.

Figure 6:
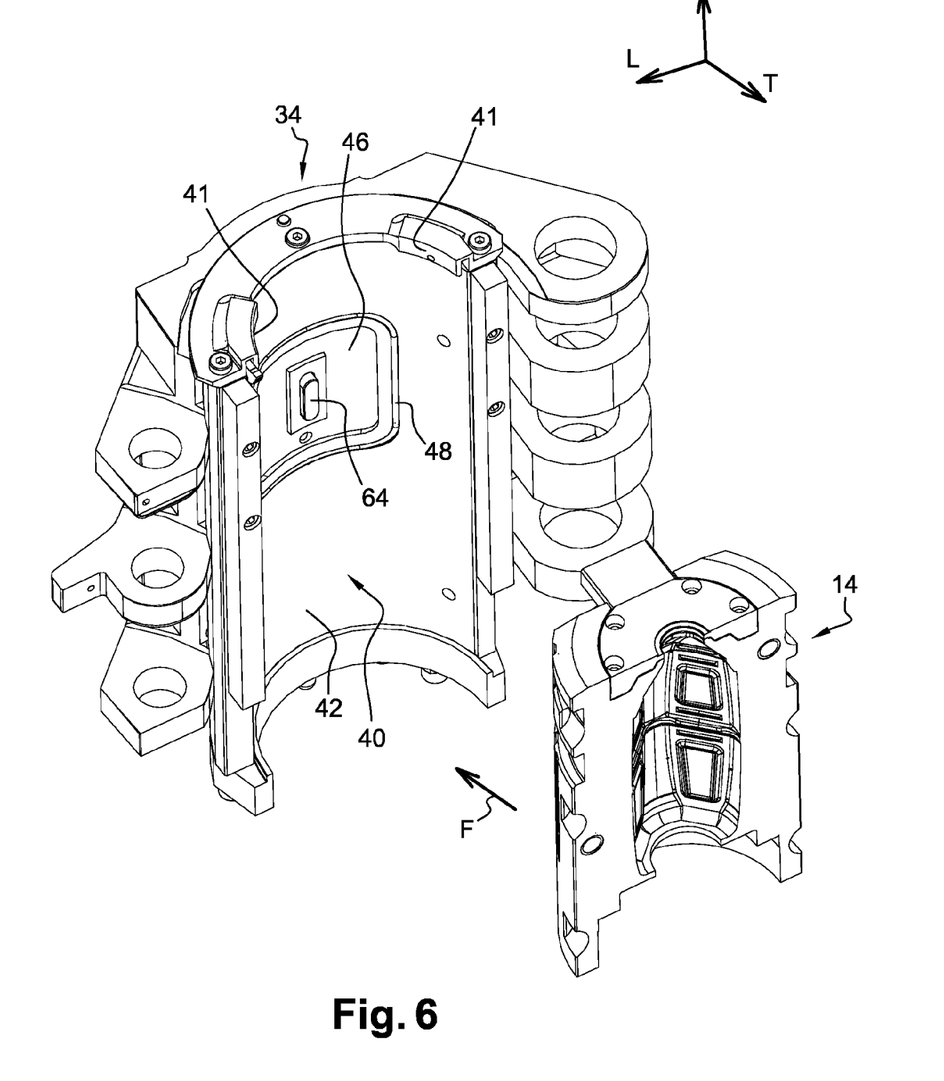
FIG. 6 is an exploded perspective view showing a mold-carrier and a half-mold ready to be inserted in a recess of the mold-carrier in the mounting direction indicated by the arrow "F"

As shown in FIG. 6, each half-mold 14 is more particularly adapted to be received in a recess 40 of the associated mold-carrier 34 to occupy a mounted position.

The recess 40 of the mold-carrier 34 is designed so that the half-mold 14 is mounted in and demounted from its recess 40 by movement in translation parallel to the opening of the mold 12 formed by the two half-molds 14. Here the mounting direction is oriented transversely as indicated by the arrow "F".

The molding device 10 includes fixing means that are adapted to fix each half-mold 14 demountably in the mounted position in the recess of the associated mold-carrier 34. These means are described in more detail hereinafter.

The recess 40 is delimited transversely toward the exterior by a bottom 42 of semi-cylindrical shape complementary to the external face 20 of the half-mold 14 so that the external face 20 of the half-mold 14 and the bottom 42 of the recess 40 of the mold-carrier 34 are in contact, pressed against each other, to enable transfer of heat by thermal conduction between the half-mold 14 and the means for regulating the temperature of the mold-carrier 34.

Moreover, the recess 40 is delimited in the vertically upward direction by the lower face of a rim 41 that extends transversely inward, projecting relative to the bottom 42 of the recess 40, as shown in FIG. 6. An upper face of the half-mold 14 is adapted to come into contact with this rim 41 to enable vertical positioning of the half-mold 14 relative to the mold-carrier 34.

The molding device 10 includes fixing means 40 adapted to fix demountably to the mold-carrier 34 each half-mold 14 occupying a mounted position. These fixing means are advantageously also adapted to press or clamp the half-mold 14 against the bottom 42 of the associated recess of the mold-carrier 34 in order to ensure that no air film remains liable to insulate the half-mold 14 thermally from the mold-carrier 34.

Only the fixing means for one mold-carrier 34 are described hereinafter, the fixing means being identical for the other mold-carrier 34.

According to the teachings of the invention, the fixing means are controlled attraction means that attract the half-mold 14 against the mold-carrier 34. By attraction means is meant means that do not employ locking or clamping faces to hold the half-mold 14 clamped in its position mounted in the associated recess 40.

In a first embodiment of the invention that is shown in FIGS. 6 to 9, the fixing means are sucker-effect aspiration means.

Figure 7:
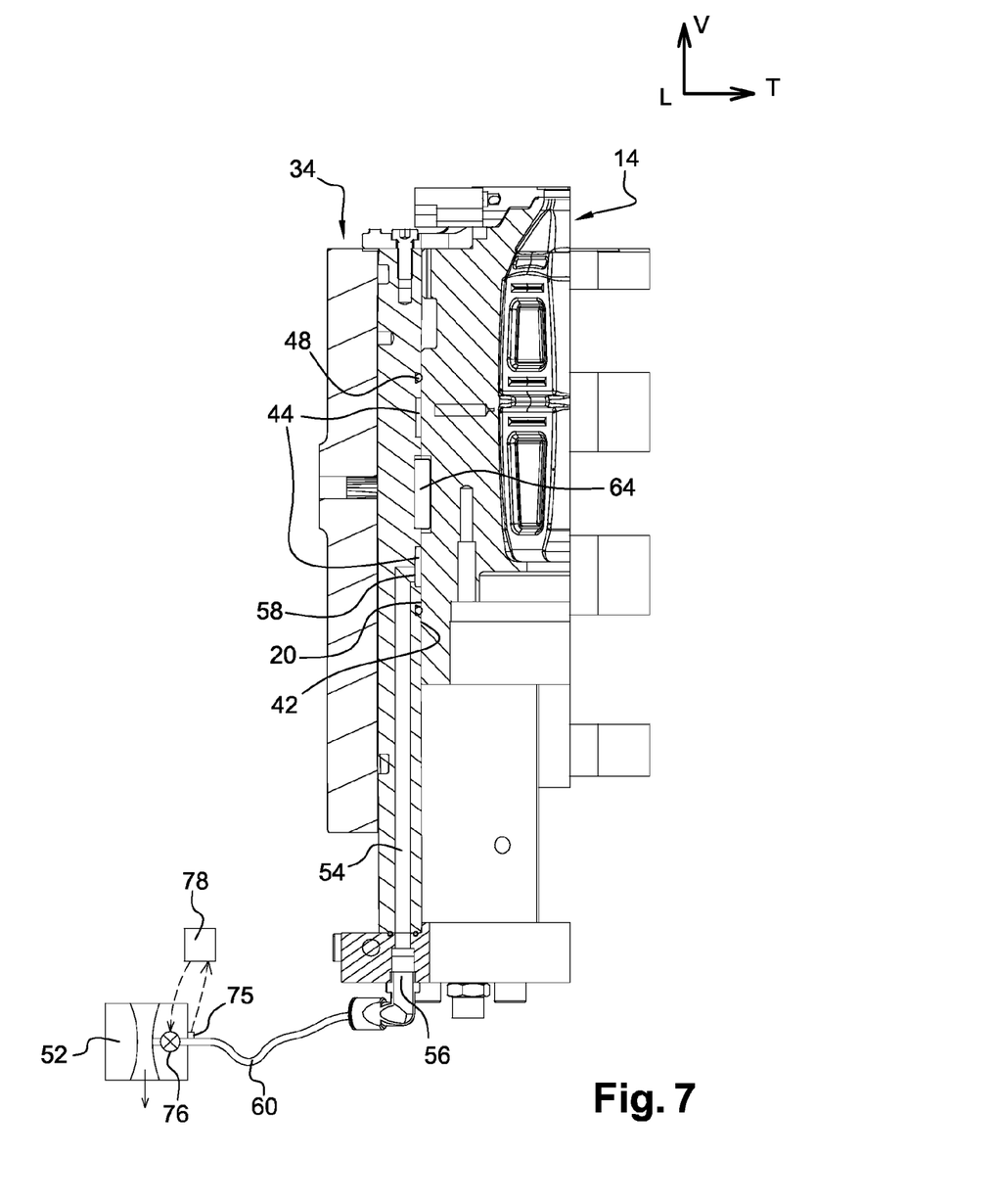
FIG. 7 is a view in section taken along the line 7-7 in FIG. 4.

The fixing means mainly include an airtight chamber 44 that is reserved at the interface between the mold-carrier 34 and the half-mold 14 in the mounted position on the mold-carrier 34, as shown in FIG. 7. The interface between the mold-carrier 34 and the half-mold 14 is formed here by the contact between the bottom 42 of the recess 40, on the one hand, and the external face 20 of the half-mold 14, on the other hand. In other words, the airtight chamber 44 is disposed between the mold-carrier 34 and the half-mold 14.

As explained hereinafter, this airtight chamber 44 is adapted to be subjected to a so-called fixing pressure that is less than atmospheric pressure in order to hold the half-mold 14 pressed into its recess 40 by a sucker effect.

Figure 8:
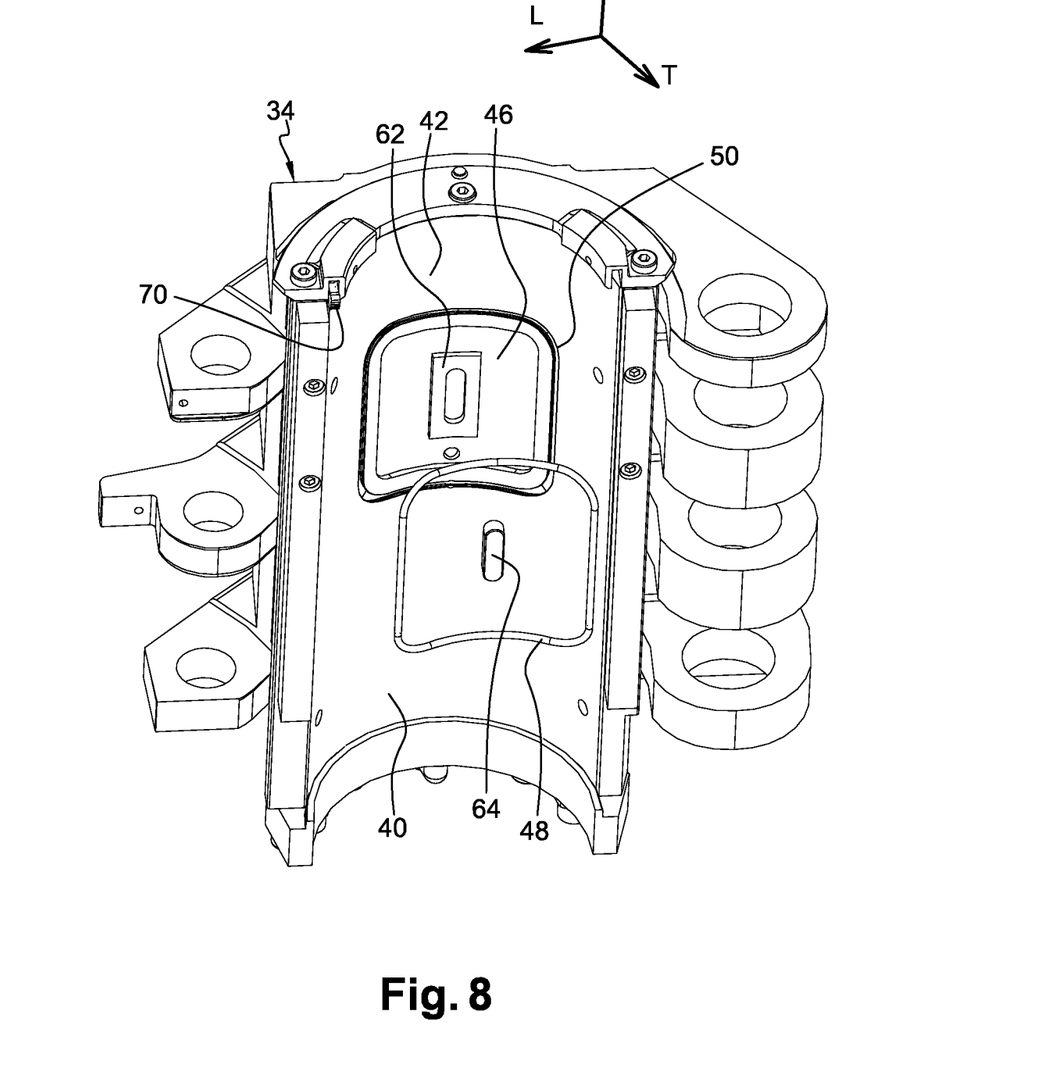
FIG. 8 is an exploded perspective view showing the recess of a mold-carrier equipped with a cavity, a seal and a key.
Figure 9:
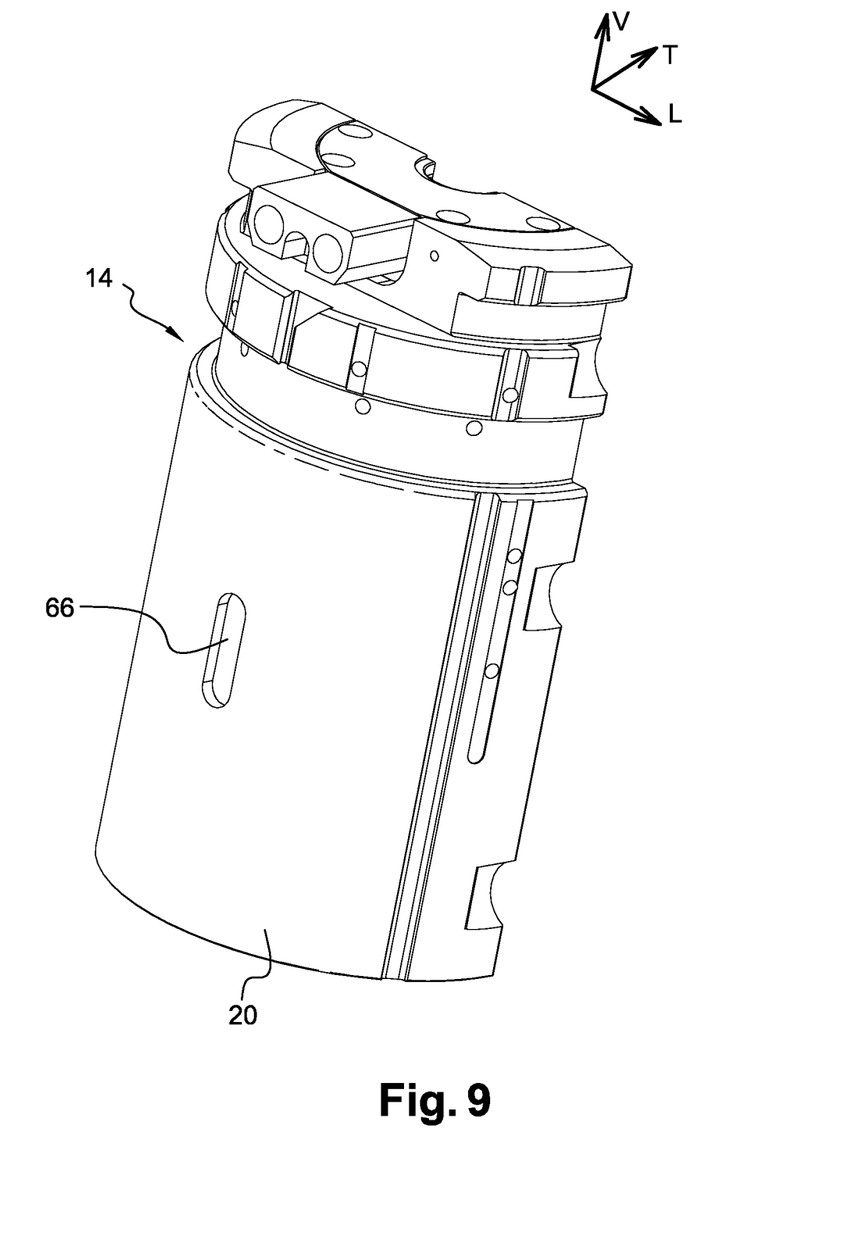
FIG. 9 is a perspective view showing the external face of a half-mold.

As shown more precisely in FIG. 8, the airtight chamber 44 is formed here in part by a cavity 46 that is produced in the bottom 42 of the recess 40, vertically in line with the center of mass of the half-mold 14.

When the half-mold 14 is in the mounted position, its external face 20 comes into contact with the bottom 42 of the recess 40, thus transversely closing the cavity 46 to form the airtight chamber 44.

Here the cavity 46 has a contour of rectangular shape with rounded corners. Clearly the cavity 46 may have a contour of different shape, however.

The cavity 46 is advantageously shallow in order for the airtight chamber 44 to have a small volume. The intensity of the aspiration or attraction force exerted by the vacuum is proportional to the area delimited by the contour of the airtight chamber 44. Here the cavity 46 has a constant depth of a few millimeters relative to the bottom 42 of the recess 40.

In a variant of the invention that is not shown, the airtight chamber is formed in part by a cavity that is produced in the external face of the half-mold. The airtight chamber is then closed by the bottom of the recess.

In a further variant of the invention that is not shown, the airtight chamber is formed in part by a cavity that is produced in the bottom of the mold and in part by a cavity that is produced in the external face of the half-mold.

As shown in FIGS. 7 and 8, the airtight chamber 44 is sealed by a continuous seal 48 that externally surrounds the contour of the cavity 46.

Here the seal 48 is carried by the mold-carrier 34. To this end, it is received in an annular groove 50 that is produced in the bottom 42 of the recess 40 of the mold-carrier 34.

The seal 48 is thus adapted to be compressed between the external face 20 of the half-mold 14 and the bottom of the recess to seal the airtight chamber 44.

In a variant of the invention that is not shown, the seal could also be carried by the external face of the half-mold.

Furthermore, as shown in FIG. 7, the airtight chamber 44 communicates with a vacuum source 52 via an aspiration pipe 54 to establish in the airtight chamber 44 a pressure lower than atmospheric pressure. The vacuum source 52 is adapted to be commanded selectively between an activated state in which the fixing means are active and a deactivated state in which the fixing means are inactive.

Here the aspiration pipe 54 is produced within the thickness of the mold-carrier 34. It extends from an orifice 56 for connection to the source 52, said connecting orifice 56 being at the bottom of the mold-carrier 34, as far as an orifice 58 that opens into the airtight chamber 44.

The connecting orifice 56 includes connection means intended to be connected with the vacuum source 52 via a flexible hose 60. The flexible hose 60 enables the vacuum source 52 to be installed on a support fixed relative to the carousel, for example the bracket 38, whereas the mold-carrier 34 is mobile.

In a variant of the invention that is not shown, the vacuum source is disposed directly on the mold-carrier.

The vacuum source 52 is formed for example by a Venturi effect pump shown diagrammatically in FIG. 7. This pump 52 includes a Venturi tube having a smaller section in the middle. A flow of compressed air passes through the Venturi tube and creates a reduced pressure in the reduced section. The aspiration pipe 54 is connected to the Venturi tube at the level of the reduction in size to enable aspiration of air contained in the airtight chamber 44.

The airtight chamber 44 being empty during use of the device 10, it provides local isolation between the half-mold 14 and the mold-carrier 34.

However, there is then a risk of the thermal regulation of the half-mold 14 no longer being homogeneous.

To solve this problem, here the airtight chamber 44 has a central protuberance 62 that extends to a free face flush with the surface of the bottom 42 of the recess 40.

The free face of the protuberance 62 is notably adapted to enable exchange of heat by conduction in a globally homogeneous manner between the half-mold 14 and the bottom 42 of the recess to facilitate.

In a variant of the invention that is not shown, the airtight chamber includes a plurality of protuberances of the type described in the preceding paragraph to enable even more homogeneous exchange of heat over the whole of the external face of the half-mold.

In a further variant of the invention that is not shown, the airtight chamber is formed by at least one groove produced in the external face of the half-mold and/or in the bottom of the recess of the mold-carrier. The groove forms an array of circumvolutions adapted to form an airtight chamber the contour of which delimits a suitable area at the same time as retaining points of contact homogeneously distributed between the half-mold and the bottom of the recess.

The molding device 10 advantageously further includes positioning means operative between the mold-carrier 34 and the half-mold 14 through cooperation of complementary shapes such as ribs/grooves or flats cooperating with each other, notably for positioning in the vertical direction, but also around the vertical axis "X" of the half-mold 14.

Without these positioning means, the semi-cylindrical external face 20 of the half-mold 14 would be liable to pivot relative to the recess 40 about the vertical axis "X" when they are positioned.

The positioning means are means operative via nesting of complementary shapes between the associated half-mold 14 and the associated mold-carrier 34.

More particularly, as shown in FIG. 8, the bottom 42 of the recess 40 is equipped with a positioning peg or key 64 that extends in the transverse direction "F" in which the half-mold 14 is mounted. This positioning key 64 is adapted to be received in a facing positioning orifice 66 in the external face 20 of the half-mold 14, as shown in detail in FIG. 9.

Here the key 64 is at the center of the free face of the protuberance 62 of the recess 40. In this arrangement, the key 64 is advantageously produced in a material that has a high thermal conductivity in order to favor exchanges of heat between the half-mold 14 and the mold-carrier 34.

Moreover, to prevent the half-mold 14 from falling during the operation of mounting the half-mold 14 in its recess 40, the half-mold 14 is equipped with mechanical means for attaching it to the mold-carrier 34 in order to be able to retain the half-mold 14 on the mold-carrier 34 when the controlled attraction means are stopped, i.e. when the pressure in the airtight chamber 44 is greater than or equal to a fixing pressure of the half-shell 14.

These attachment means are not means for fixing the half-mold 14 into its recess 40 in that they do not enable clamping of the half-mold 14 against the bottom 42 of the recess 40. They only enable retention of the half-mold 14 in its recess 40 pending its fixing by the sucker effect.

The suction fixing means are adapted to fix the half-mold 14 against the mold-carrier 34 even in the absence of attachment means.

Figure 10:
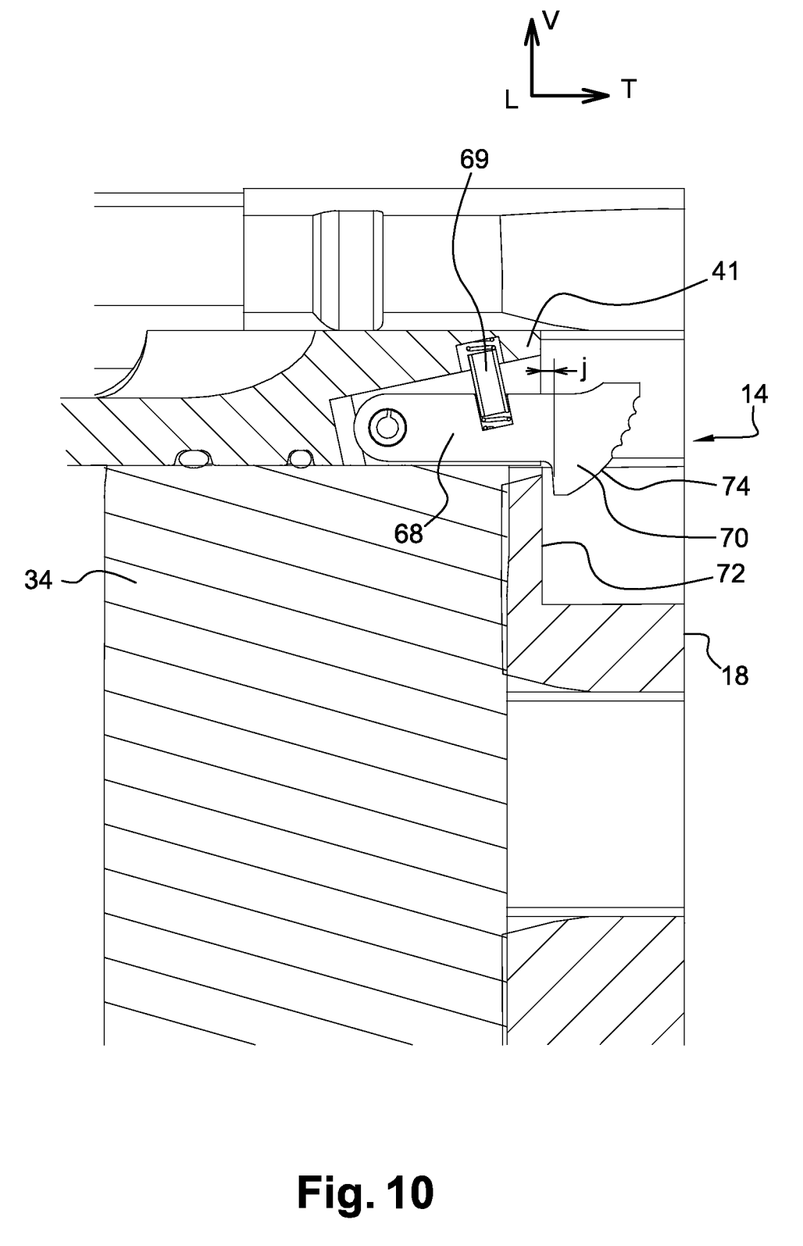
FIG. 10 is a view in section taken along the line 10-10 in FIG. 4 showing means for attaching a half-mold in its recess.

As shown in FIG. 10, the attachment means include a lock 68 that is mounted to be mobile in the mold-carrier 34. Here the lock 68 is in the upper rim 41 of the mold-carrier 34 so that its hook-shaped free head 70 projects transversely relative to the edge of the mold-carrier 34.

The lock 68 is mounted to pivot between a low attachment position into which it is spring-loaded by a spring 69 and that is shown in FIG. 10 and a high release position (not shown).

In its low locking position, the head 70 of the lock 68 is able to cooperate with a locking face 72 carried by the half-mold 14. Here the locking face 72 is parallel to the joint face 18 of the half-mold 14.

The head 72 of the lock 70 further includes a ramp 74 at the front end enabling the lock 70 to be driven automatically toward its high release position on insertion of the half-mold 14 into its recess 40 by contact with a face of the half-mold 14.

This ramp 74 also forms a bearing surface that enables an operator to press upward with their finger to drive the lock 70 toward its high release position when demounting the half-mold 14.

Accordingly, when the half-mold 14 is in its mounted position before the fixing means are activated, it is retained vertically in its mounted position by the key 64, longitudinally by the semi-cylindrical shape of the bottom 42, and transversely by the lock 68 in its low position.

In a variant of the invention that is not shown, each mold-carrier is equipped with a plurality of airtight chambers, for example two chambers, smaller than that shown in the figures. This provides a plurality of anchor points. At least some of the airtight chambers are advantageously disposed at places in which exchange of heat between the half-mold and the mold-carrier is not necessary, for example below the level of the imprint.

Furthermore, still in this variant, the airtight chambers may be connected to a common vacuum pump or to separate vacuum pumps.

When mounting the half-mold 14 on the associated mold-carrier 34, the supply of compressed air to the Venturi tube is cut off. The vacuum source is thus deactivated.

The half-mold 14 is then inserted by transverse movement in translation toward the bottom 42 of the recess 40 in its mounting direction "F". During this insertion, the half-mold 14 comes into contact with the ramp at the end of the lock 68, thus causing it to be moved toward its high position.

When the half-mold 14 reaches the bottom of the recess 40 in its mounted position, the lock 68 is spring-loaded toward its low locking position in which it retains the half-mold 14 transversely in its mounted position pending fixing it and pressing it against the bottom 42 of the recess 40.

In its mounted position, the external face 20 of the half-mold 14 cooperates with the bottom 42 of the recess 40 to close the cavity 46 in order to form the airtight chamber 44. The seal 40 is compressed by the half-mold 14 to seal the airtight chamber 44.

The Venturi effect pump 52 is then activated. The vacuum sources of all the mold-carriers 34 are activated simultaneously, for example, when the operator has finished equipping all of the devices 10 with their mold 12.

The Venturi-effect pump 52 then aspirates the air present in the airtight chamber 44, thus provoking a sucker effect that enables the external face 20 of the half-mold 14 to be pressed against the bottom of the recess 40.

This enables the seal to be compressed even more, and thus the air tightness of the airtight chamber 44 to be increased.

The reduced pressure in the airtight chamber 44 advantageously creates a force of attraction that attracts the half-mold 14 transversely against the bottom 42 of the recess 40 of the mold-carrier 34. The force of attraction is exerted more particularly on the portion of the external face 20 of the half-mold 14 that closes the airtight chamber 44.

In this state, as shown in FIG. 10, the head 70 of the attachment means is no longer in contact with the half-mold 14. There remains a transverse clearance "j" between the head 70 and the blocking face 72 of the half-mold 14. Thus the sucker effect on its own enables the half-mold 14 to be fixed in the mold-carrier 34.

The dimensions of the airtight chamber 44 and the pressure in the airtight chamber 44 when the Venturi-effect pump is operating are chosen so that the force of attraction exerted by the reduced pressure in the airtight chamber 44 is sufficient to hold the half-mold 14 fixed during operation of the blower device, including during rapid and repeated opening and closing of the mold-carrier 34 to eject the chambers formed by blowing.

The Venturi-effect pump 52 advantageously includes means 75 for measuring the pressure in the airtight chamber 44 and a control valve 76 for closing the aspiration conduit 54, 60 in sealed manner. The control valve 76 is disposed between the means 75 for measuring the pressure.

The device 10 further includes an electronic control unit 78 enabling control of the closing of the control valve 76 and supply of compressed air to the Venturi tube.

The pressure measuring means 75 are able to communicate the measured pressure to the electronic control unit 78.

If the measured pressure is less than or equal to the fixing pressure, the electronic control unit 78 commands closure of the control valve 76 and cuts off the supply of compressed air to the Venturi tube. Thus the airtight chamber 44 is maintained at its fixing pressure with no external source of energy.

However, if the pressure in the airtight chamber 44 is measured as being greater than the fixing pressure, for example because of slight air leaks, the electronic control unit 78 commands reactivation of the supply of compressed air to the Venturi tube and opening of the control valve 76 in order to aspirate the air contained in the airtight chamber 44.

During demounting of the half-mold 14, the airtight chamber 44 is returned to atmospheric pressure, for example by deactivating the vacuum source by opening the control valve 76.

The operation of the vacuum source 52 may advantageously be reversible in order to enable the pressure in the airtight chamber 44 to exceed atmospheric pressure.

It has been found that if the half-mold 14 has remained for several hours pressed against the bottom of the recess 40 the half-mold 14 frequently adheres to the mold-carrier 34. This adhesion is liable to slow down the operation of demounting the half-mold 14.

To reverse the operation of the Venturi effect pump 52, it is for example possible to blow directly into the aspiration conduit 54 the compressed air that normally feeds the Venturi tube. This may be effected by means of a three-port valve (not shown).

Reversing the operation of the vacuum pump enables an increased pressure to be created in the airtight chamber 44. This increased pressure causes the half-mold 14 to become unstuck. During this unsticking operation, it is very advantageous to dispose attachment means 68 as described above to prevent the half-mold 14 being thrown out of its recess.

In a second embodiment of the invention, not shown, the half-mold 14 is fixed to the mold-carrier 34 by magnetic attraction. In the remainder of the description of this second embodiment, the reference numbers are used by analogy with FIGS. 1 to 10.

In this second embodiment, the airtight chamber 44 and the vacuum source 52 are respectively replaced by an electromagnet and by a source of electric current.

In this case, the electromagnet is carried by the mold-carrier 34. The electromagnet is for example disposed within the thickness of the mold-carrier 34. The electromagnet conventionally includes a ferromagnetic material core and a winding consisting of electrical conductors. It is adapted to emit a magnetic field that is directed mainly transversely through the bottom 42 of the recess 40.

The half-mold 14 may then be produced either in a ferromagnetic material or equipped with magnetic or ferromagnetic material inserts that will be attracted by a magnetic field emitted by the electromagnet.

The inserts are advantageously polarized so that the half-mold 14 may be unstuck from the mold-carrier 34 by merely reversing the electric current in the electromagnet.

The electromagnet advantageously exerts on the external face of the half-mold a force of magnetic attraction that attracts the half-mold 14 against the bottom 42 of the recess 40.

The fixing means by attraction produced in accordance with the invention thus enable removable fixing of the half-mold on the mold-carrier to be achieved with few moving parts. This notably enables a great reduction in production costs as well as in maintenance costs by avoiding wear of moving parts.

Moreover, these fixing means enable rapid and highly ergonomic fixing of the half-molds 14 to their mold-carrier 34.

The invention claimed is:

1. Molding device (10) for a machine for producing chambers, notably bottles, in thermoplastic material by blowing or drawing-blowing a pre-heated preform, the molding device (10) including:
   two half-molds (14) each of which is provided with a half-imprint (16) and each of which includes a joint face (18) and an external face (20);
   two mold-carriers (34) each of which is provided with a recess (40) intended to receive an associated half-mold (14) in a mounted position in which the external face (20) of the half-mold (14) is in contact with the bottom (42) of the recess (40), the mold-carriers (34) being provided with means for regulating the temperature of the imprint (16) by thermal conduction between the half-mold (14) and the means for regulating the temperature of the mold-carrier (34); and
   fixing means (44, 52) adapted to fix each half-mold (14) demountably in the recess (40) of the associated mold-carrier (34),
characterized in that the fixing means (44, 52) are controlled means for aspiration by the sucker effect of the half-mold (14) against the bottom (42) of the recess (40) of the mold-carrier (34).

2. Device (10) according to claim 1, characterized in that the half-mold (14) is adapted to be mounted in and demounted from its recess by a movement in translation orthogonal to the joint face (18) of the half-mold (14).

3. Device (10) according to claim 1, characterized in that at least one airtight chamber (44) is reserved at the interface between the mold-carrier (34) and the half-mold (14) in the position mounted on the mold-carrier (34), and in that the airtight chamber (44) communicates with a vacuum source (52) via an aspiration conduit (54) to enable establishing in the airtight chamber (44) of a fixing pressure less than atmospheric pressure.

4. Device (10) according to claim 3, characterized in that the airtight chamber (44) is formed in part by a cavity that is formed in the external face (20) of the half-mold (14).

5. Device (10) according to claim 3, characterized in that the airtight chamber (44) is formed at least in part by a cavity (46) that is formed in the bottom (42) of the recess (40) in the mold-carrier (34).

6. Device (10) according to claim 3, characterized in that the airtight chamber (44) is sealed by at least one seal that is carried by the half-mold (14).

7. Device according to claim 3, characterized in that the airtight chamber (44) is sealed by at least one seal (48) that is carried by the mold-carrier (34).

8. Device according to claim 1, characterized in that the half-mold (14) includes means (64, 66) for positioning it on the mold-carrier (34).

9. Device (10) according to claim 8, characterized in that the positioning means (64, 66) are means operative via nesting of complementary shapes between the associated half-mold (14) and the associated mold-carrier (34).

10. Device according to claim 1, characterized in that the half-mold (34) is equipped with means (68) for mechanically attaching it to the mold-carrier (34) in order to enable retention of the half-mold (14) on the mold-carrier (34) on stopping the controlled fixing means (44, 52).

11. Device (10) according to claim 2, characterized in that at least one airtight chamber (44) is reserved at the interface between the mold-carrier (34) and the half-mold (14) in the position mounted on the mold-carrier (34), and in that the airtight chamber (44) communicates with a vacuum source (52) via an aspiration conduit (54) to enable establishing in the airtight chamber (44) of a fixing pressure less than atmospheric pressure.

12. Device (10) according to claim 4, characterized in that the airtight chamber (44) is formed at least in part by a cavity (46) that is formed in the bottom (42) of the recess (40) in the mold-carrier (34).

13. Device (10) according to claim 4, characterized in that the airtight chamber (44) is sealed by at least one seal that is carried by the half-mold (14).

14. Device according to claim 4, characterized in that the airtight chamber (44) is sealed by at least one seal (48) that is carried by the mold-carrier (34).

15. Device according to claim 5, characterized in that the airtight chamber (44) is sealed by at least one seal (48) that is carried by the mold-carrier (34).

16. Device according to claim 6, characterized in that the airtight chamber (44) is sealed by at least one seal (48) that is carried by the mold-carrier (34).

17. Device according to claim 2, characterized in that the half-mold (14) includes means (64, 66) for positioning it on the mold-carrier (34).

18. Device according to claim 3, characterized in that the half-mold (14) includes means (64, 66) for positioning it on the mold-carrier (34).

19. Molding device (10) for a machine for producing chambers, notably bottles, in thermoplastic material by blowing or drawing-blowing a pre-heated preform, the molding device (10) including:
   two half-molds (14) each of which is provided with a half-imprint (16) and each of which includes a joint face (18) and an external face (20);
   two mold-carriers (34) each of which is provided with a recess (40) intended to receive an associated half-mold (14) in a mounted position in which the external face (20) of the half-mold (14) is in contact with the bottom (42) of the recess (40); and
   fixing means (44, 52) adapted to fix each half-mold (14) demountably in the recess (40) of the associated mold-carrier (34),
   characterized in that the fixing means (44, 52) are controlled means for aspiration by the sucker effect of the half-mold (14) against the bottom (42) of the recess (40) of the mold-carrier (34),
characterized in that at least one airtight chamber (44) is reserved at the interface between the mold-carrier (34) and the half-mold (14) in the position mounted on the mold-carrier (34), and in that the airtight chamber (44) communicates with a vacuum source (52) via an aspiration conduit (54) to enable establishing in the airtight chamber (44) of a fixing pressure less than atmospheric pressure, and
characterized in that the airtight chamber (44) is sealed by at least one seal that is carried by one of the group consisting of i) the half-mold (14), and ii) the mold-carrier (34).

20. Molding device (10) for a machine for producing chambers, notably bottles, in thermoplastic material by blowing or drawing-blowing a pre-heated preform, the molding device (10) including:
   two half-molds (14) each of which is provided with a half-imprint (16) and each of which includes a joint face (18) and an external face (20);
   two mold-carriers (34) each of which is provided with a recess (40) intended to receive an associated half-mold (14) in a mounted position in which the external face (20) of the half-mold (14) is in contact with the bottom (42) of the recess (40); and
   fixing means (44, 52) adapted to fix each half-mold (14) demountably in the recess (40) of the associated mold-carrier (34),
   characterized in that the fixing means (44, 52) are controlled means for aspiration by the sucker effect of the half-mold (14) against the bottom (42) of the recess (40) of the mold-carrier (34), and
characterized in that the half-mold (34) is equipped with means (68) for mechanically attaching it to the mold-carrier (34) in order to enable retention of the half-mold (14) on the mold-carrier (34) on stopping the controlled fixing means (44, 52).

* * * * *